United States Patent [19]

Kuribayashi et al.

[11] Patent Number: 5,376,422

[45] Date of Patent: Dec. 27, 1994

[54] OPTICAL RECORDING MEDIUM AND APPARATUS FOR PLAYING SUCH A MEDIUM

[75] Inventors: Hiroki Kuribayashi; Fumihiko Yokogawa, both of Tsurugashima, Japan

[73] Assignee: Pioneer Electronic Corporation, Tokyo, Japan

[21] Appl. No.: 886,105

[22] Filed: May 21, 1992

[30] Foreign Application Priority Data

Oct. 14, 1991 [JP] Japan .................................. 3-264942

[51] Int. Cl.$^5$ .............................................. B32B 3/00
[52] U.S. Cl. ......................................... 428/64; 428/45;
428/913; 346/76 L; 346/135.1; 369/788
[58] Field of Search ........................... 428/64, 65, 913;
346/76 L, 135.1; 369/288

[56] References Cited

U.S. PATENT DOCUMENTS

| | | | |
|---|---|---|---|
| 4,290,122 | 9/1981 | Bates et al. | 365/234 |
| 4,956,214 | 9/1990 | Imataki et al. | 428/64 |
| 5,018,123 | 5/1991 | Hosoya et al. | 369/44 |

Primary Examiner—Patrick J. Ryan
Assistant Examiner—Elizabeth Evans
Attorney, Agent, or Firm—Sughrue, Mion, Zinn, Macpeak & Seas

[57] ABSTRACT

An optical recording medium in which tracks are constructed by a plurality of combination tracks and the distance between tracks is narrowed so that data is recorded at a high density, and a playing apparatus for such a medium. The recording medium has a plurality of combination tracks whose track pitch is smaller than a spot diameter of a reading beam of an optical pickup. A track gap which is larger than an optical cut-off wavelength of the optical pickup and is larger than the track pitch is provided for each combination track. The playing apparatus includes a reading device which generates reading beam spots which are equal in number to the tracks constructing the combination track of the recording medium, and a tracking error detecting section for detecting a level difference between two reading signals obtained from tracks at both inner and outer peripheries of the combination track by the reading means, thereby detecting a tracking error.

5 Claims, 4 Drawing Sheets

OPTICAL RECORDING MEDIUM AND APPARATUS FOR PLAYING SUCH A MEDIUM

BACKGROUND OF THE INVENTION

1. Field of the Invention

The invention relates to an optical recording medium such as an optical disc or the like and an apparatus for playing such a medium.

2. Description of Background Information

Three beam method is an example of prior art methods for detecting tracking errors on an optical disc used as an optical recording medium. If this conventional method is used for playing the optical disc on which data is recorded at a high density by narrowing a track pitch, a dark and light contrast of the ON track and OFF track cannot be obtained. This would result in a problem such that detection of a tracing error cannot be performed.

OBJECT AND SUMMARY OF THE INVENTION

The present invention has been made to solve such a problem, and it is an object of the invention to provide an optical recording medium on which data is recorded at a high density, as well as an optical recording medium playing apparatus for playing such a recording medium.

The optical recording medium according to the invention has a plurality of combination tracks whose track pitch is smaller than the spot diameter of a reading beam of an optical pickup and a track gap which is larger than an optical cut-off wavelength of the optical pickup and is larger than the track pitch, is provided for each combination track.

The apparatus for playing the optical recording medium as mentioned above according to the invention comprises: reading means comprising optical pickup generating reading beam spots whose number is equal to the number of tracks constituting a combination track; and a tracking error detecting section to detect a level difference between two reading signals obtained from both inner and outer peripheries of the combination track in the reading means, thereby detecting a tracking error.

DETAILED DESCRIPTION OF THE PREFERRED EMBODIMENT

An embodiment of the present invention will be described in detail hereinbelow with reference to the drawings.

Figure 1:
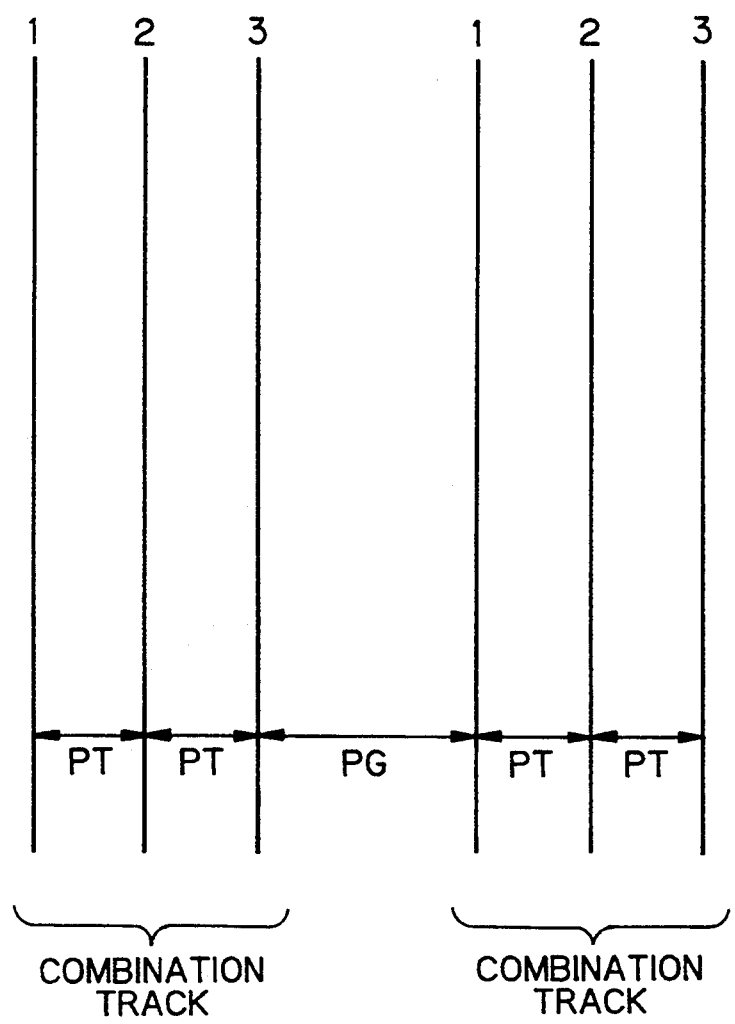
FIG. 1 is a diagram showing an enlarged view of tracks on an optical recording medium according to the present invention.

FIG. 1 is an enlarged diagram of a track section on an optical recording medium according to the invention.

In FIG. 1, PT denotes a pitch of tracks which together form a combination track, that is, a track pitch. The track pitch is smaller than the spot diameter of a reading beam of an optical pickup. The spot diameter is equal to a beam diameter at a level of $1/e^2$ of the peak of a beam power, and has a value about 0.82 $\lambda/NA$ ($\lambda$: wavelength, NA: numerical aperture). In FIG. 1, PG indicates an interval between the combination tracks and is set to an interval which is larger than an optical cut-off wavelength of the optical pickup and is larger than the track pitch. The cut-off wavelength is equal to about 0.5 $\lambda/NA$ ($\lambda$: wavelength, NA: numerical aperture). Although the combination track is formed by three tracks in FIG. 1, the number of tracks can be set to an arbitrary value of two or more.

Figure 2:
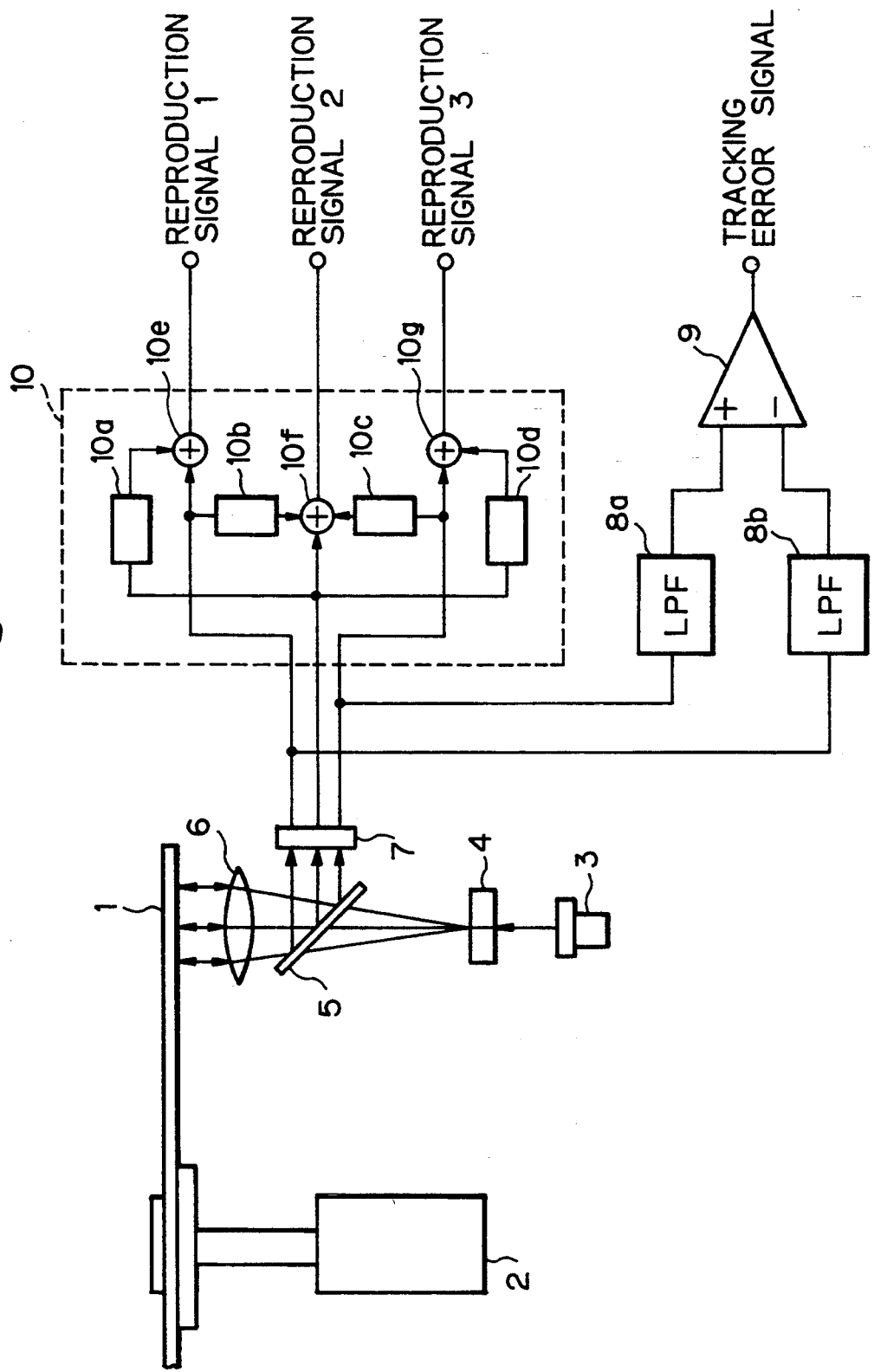
FIG. 2 is a diagram showing the construction of an apparatus for playing an optical disc on which data has been recorded at a high density according to the present invention.

FIG. 2 is a diagram showing the construction of an apparatus for playing an optical recording medium according to the invention.

When an optical recording medium which is rotated by a rotating drive motor 2 is an optical disc 1 on which the combination track is formed by three tracks, a laser beam emitted from a laser light source 3 is divided into three beams through a grating lens 4. Those three beams pass through a half mirror 5 and are irradiated onto the combination track of the optical disc 1 through an objective lens 6. Three read-out lights reflected by the optical disc 1 enter the half mirror 5 through the objective lens 6. The three read-out lights are led to a photodetector 7 by the half mirror 5 and are converted into electric signals and are outputted as reproduction signals 1 to 3 through a crosstalk eliminating circuit 10, respectively. The crosstalk eliminating circuit 10 eliminates the crosstalk from the adjacent tracks, for example, by the following method. Specifically, the crosstalk eliminating circuit 10 performs the elimination of crosstalk by adding, by adders 10e through 10g respectively, each of the electric signals from the photodetector 7 and, among the electric signals from the adjacent tracks, signal(s) obtained by transmitting such electric signals through filter circuits 10a to 10d for correcting a time difference occurring due to a distance of the reading beam spots in the track direction, attenuating the electric signal and effecting a phase inversion of the electric signal. If the distance between the reading beam spots in the track directions is set to a value which is an integer multiple of a clock of data to be recorded, a delay time for correcting the time difference becomes equal to a value which is an integer multiple of the clock of data. Therefore it is preferable to determine the distance of the beam spot to such a value, so that a circuit design can be facilitated. In order to eliminate the crosstalk at a high accuracy, transversal filters are used as filter circuits 10a to 10d and coefficients of the filters are optimized so as to minimize the crosstalk of the reproduction signals 1 to 3. Among the electric signals, two electric signals corresponding to the read-out lights from both inner and outer peripheries of the combination track are supplied to a subtracter 9 comprising, for example, a differential amplifier and low pass filters 8a and 8b. The subtracter 9 outputs a level difference between those two signals as a tracking error signal. The tracking error signal is supplied to a tracking actuator (not shown), for example, for moving the objective lens 6 in the radial direction of the disc 1 and executing the tracking operation. Although the embodiment of FIG. 2 shows the playing apparatus of the optical disc in which the combination track is formed by three tracks, when the number of tracks in the combination track is equal to two or four or more, reading beams whose number is equal to the number of tracks in each combination track are prepared according to the number of tracks in the combination track.

FIGS. 3A to 3E are diagrams for explaining the principle of the tracking error detection according to the invention and showing positional states of reading beam spots with respect to tracks. FIGS. 3A to 3E show an example of the performance of the optical disc in which three tracks are provided as one combination track. In the drawings, circles SA, SB, and SC denote beam spots which are irradiated onto the optical disc. Solid lines 1, 2, and 3 as a whole indicate a combination track of the optical disc.

Figure 3A:
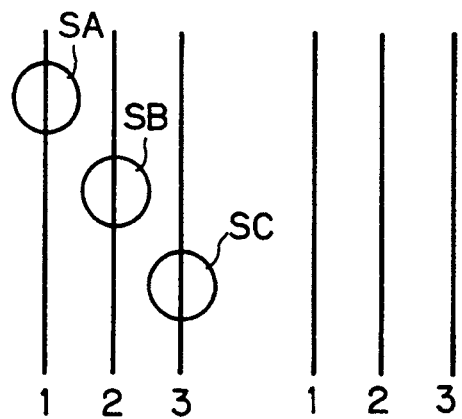
FIGS. 3A through 3E are diagrams showing positional states of reading beam spots with respect to tracks.

In the case of FIG. 3A, since both of the spots SA and SC exist on the tracks, outputs by the beam spots satisfy the condition of SA−SC=0.

Figure 3D:
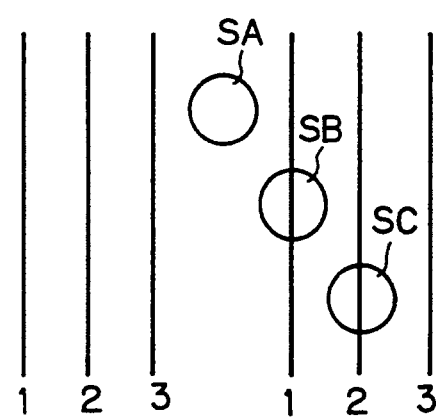
Figure 3B:
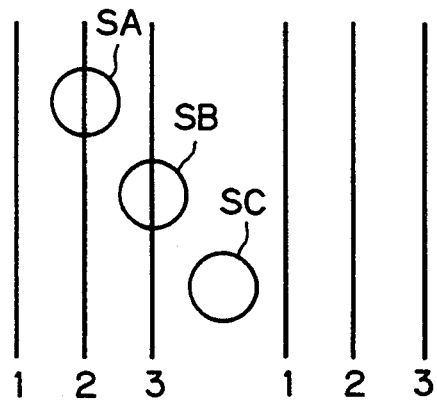

In the case of FIG. 3B, since the spot SA exists on the track and the spot SC exists on the mirror surface, the spot SA becomes dark by a diffraction of the pit, satisfying the condition of SA−SC<0.

Figure 3E:
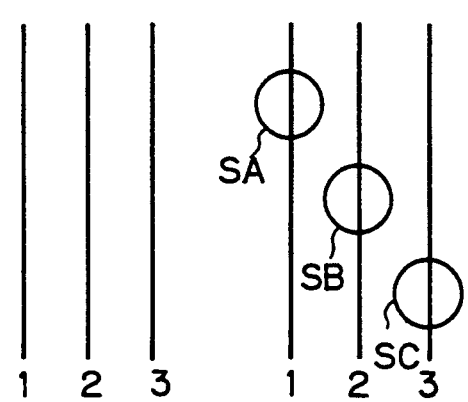
Figure 3C:
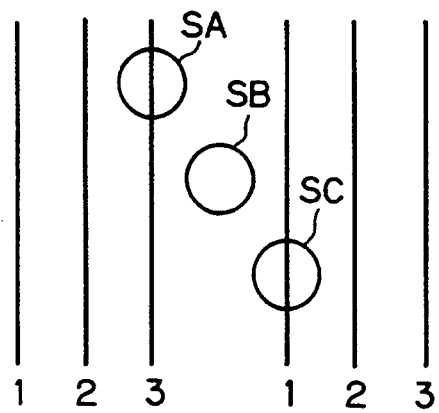

In the case of FIG. 3C, since both of the spot SA and SC exist on the tracks, the condition SA−SC=0 is satisfied.

In the case of FIG. 3D, since the spot SA exists on the mirror surface and the spot SC exists on the track, the spot SC becomes dark by a diffraction of the pit, satisfying the condition of SA−SC>0.

In the case of FIG. 3E, since both of the spots SA and SC exist on the tracks, the condition SA−SC=0 is satisfied.

When outputs of SA and SC are equal, namely, when SA−SC=0, therefore, the spot traces the center of the track. When the spot is deviated in either direction, the tracking error signal of SA−SC is no more equal to 0 but has a plus or minus value, so that the tracking error can be detected.

Figure 4A:
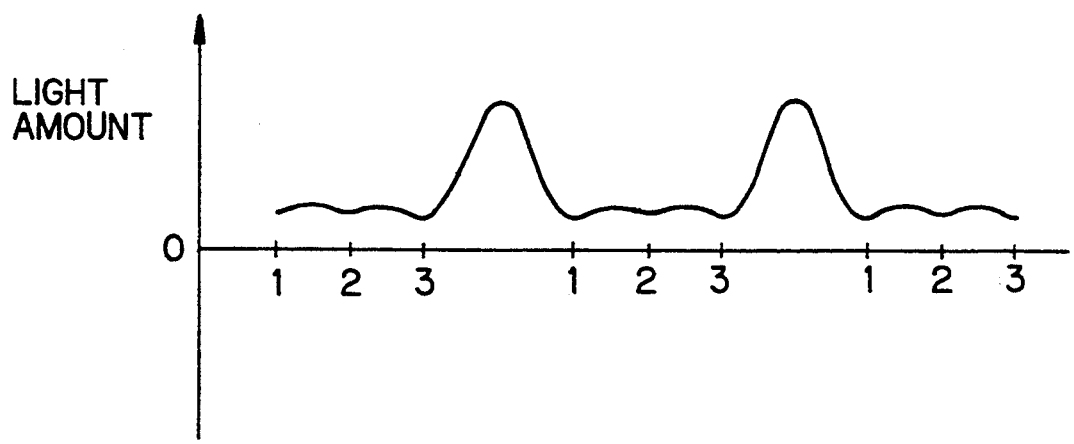
FIGS. 4A to 4C are graphs showing variation in the amount of reflection light from spots SB, SA, and SC and variation in the difference between the amounts of reflection light from the spots SA and SC.
Figure 4B:
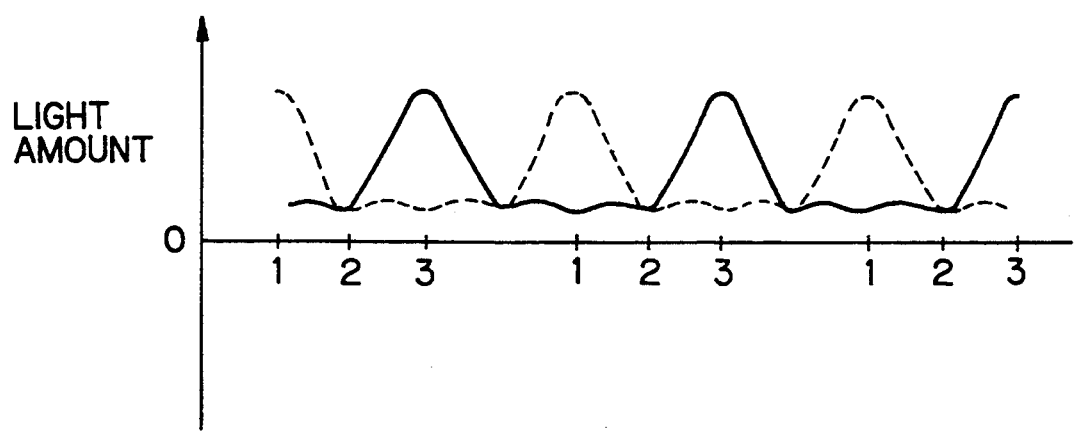
Figure 4C:
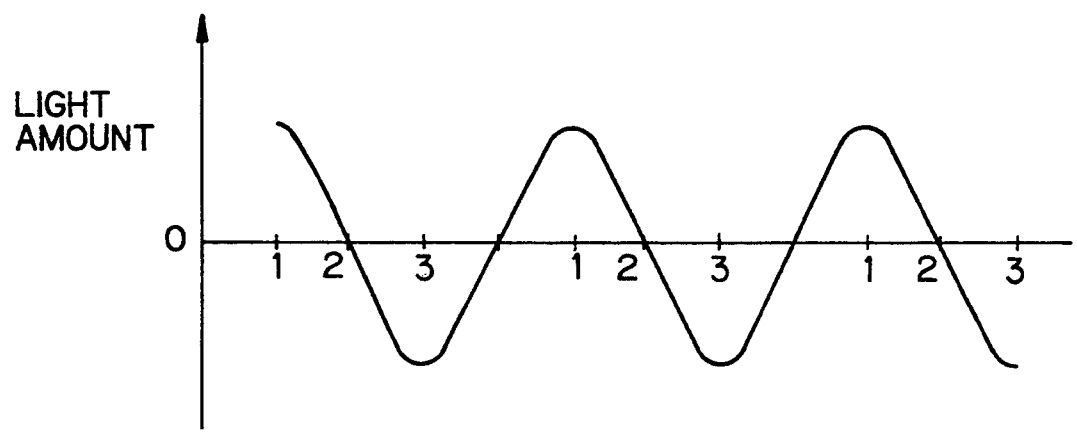

FIGS. 4A and 4B are graphs showing the manner of change in the amount of light of the spots SA, SB, and SC with respect to the position, in the radial direction of the disk, of the optical pickup generating the spots SA, SB, and SC. FIG. 4C is a graph showing a difference between the amount of light of the spots SA and SC, that is, the tracking error signal.

In FIG. 4A, a solid line shows a reflection light amount from the spot SB and an axis of abscissa indicates a position of the spot SB in the radial direction of the disc. In the drawing, reference numerals 1, 2, and 3 show a combination track and a portion between the tracks 3 and 1 denotes a gap between the group racks.

In FIG. 4B, a solid line and a dashed line denote the amounts of reflection light from the spots SA and SC and an axis of abscissa indicates a position of the spot SB in the radial direction of the disc in a manner similar to FIG. 4A. In FIG. 4B, the dashed line corresponds to the spot SA and the solid line corresponds to the spot SC, where the changes in the amounts of reflection light of the spots SA and SC are illustrated when the optical pickup is positioned so that the change in the amount of reflection light of the spot SB becomes as shown in FIG. 4A.

In FIG. 4C, a solid line denotes a difference between the reflection light amounts of the spots SA and SC, namely, a tracking error signal and an axis of abscissa indicates a position of the spot SB in the radial direction of the disc in a manner similar to FIG. 4A.

In the optical recording medium according to the invention, a plurality of tracks are formed as a combination track, a distance between adjacent combination tracks is determined to be larger than the track pitch in each combination track. A reading beam is irradiated to each combination track and the tracking error signal is obtained by the reproduction signals derived from the tracks at both inner and outer peripheries of each combination track, thereby executing the tracking servo control. Thus, the tracking of each track can be performed with a track pitch which is narrower than that in the conventional three-beam method and the recording density of the optical recording medium can be increased. Since a plurality of tracks can be read simultaneously, a transfer rate which is faster than a conventional value by a factor corresponding to the number of tracks in each combination track can be attained.

What is claimed is:

1. An optical recording medium having a plurality of combination tracks, each being separated by a track gap, and having a track pitch that is less than a spot diameter of a reading beam of an optical pickup, said track gap being greater than an optical cut-off wavelength of the optical pickup and greater than said track pitch.

2. An optical recording medium as defined by claim 1, wherein said combination tracks comprise two or more tracks.

3. An optical recording medium as defined by claim 2, wherein said two or more tracks are separated from one another by said track pitch.

4. An optical recording medium as defined by claim 1, wherein said spot diameter of the reading beam of the optical pickup equals $0.82\ \lambda/NA$, wherein $\lambda$ is the wavelength of the reading beam, and NA is the numerical aperture of an objective lens of the optical pickup.

5. An optical recording medium as defined by claim 1, wherein said cut-off wavelength equals $0.5\ \lambda/NA$, wherein $\lambda$ is the wavelength of the reading beam, and NA is the numerical aperture of an objective lens of the optical pickup.

* * * * *